(12) United States Patent
Lofranco

(10) Patent No.: US 11,930,789 B2
(45) Date of Patent: Mar. 19, 2024

(54) PET TOY

(71) Applicant: Debra Lofranco, Galloway, NJ (US)

(72) Inventor: Debra Lofranco, Galloway, NJ (US)

( * ) Notice: Subject to any disclaimer, the term of this patent is extended or adjusted under 35 U.S.C. 154(b) by 122 days.

(21) Appl. No.: 17/420,351

(22) PCT Filed: Dec. 31, 2019

(86) PCT No.: PCT/US2019/069087
§ 371 (c)(1),
(2) Date: Jul. 1, 2021

(87) PCT Pub. No.: WO2020/142502
PCT Pub. Date: Jul. 9, 2020

(65) Prior Publication Data
US 2022/0053734 A1    Feb. 24, 2022

Related U.S. Application Data

(60) Provisional application No. 62/910,144, filed on Oct. 3, 2019, provisional application No. 62/787,624, filed on Jan. 2, 2019.

(51) Int. Cl.
*A01K 15/02*    (2006.01)

(52) U.S. Cl.
CPC ................................ *A01K 15/026* (2013.01)

(58) Field of Classification Search
CPC ... A01K 15/026; A01K 15/024; A01K 15/025
See application file for complete search history.

(56) References Cited

U.S. PATENT DOCUMENTS

| | | | |
|---|---|---|---|
| 7,011,043 B2 | 3/2006 | Diep | |
| 7,565,884 B2 | 7/2009 | Lamstein | |
| 8,561,575 B2 | 10/2013 | Ruffin | |
| 8,578,890 B1 * | 11/2013 | Haaf | A01K 15/024 119/706 |
| 8,997,695 B2 | 4/2015 | Riding | |
| 10,206,373 B1 | 2/2019 | Fincher | |
| 10,244,735 B2 | 4/2019 | Wolfe, Jr. | |
| 10,477,838 B2 | 11/2019 | Dertsakyan | |
| 10,485,220 B2 | 11/2019 | Valle | |
| 2004/0194731 A1 | 10/2004 | Lineberry | |
| 2007/0295282 A1 * | 12/2007 | Lamstein | A01K 15/024 119/706 |
| 2008/0149041 A1 * | 6/2008 | Lamstein | A01K 15/024 119/706 |
| 2010/0050953 A1 * | 3/2010 | Fails, Jr. | A01K 15/024 119/706 |
| 2010/0199921 A1 * | 8/2010 | Haaf | A01K 5/0114 119/702 |
| 2011/0079183 A1 * | 4/2011 | Krotts | A01K 15/025 119/711 |
| 2011/0253060 A1 * | 10/2011 | Schotthoefer | A01K 15/024 119/706 |

(Continued)

FOREIGN PATENT DOCUMENTS

| WO | 2012075346 A2 | 6/2012 |
|---|---|---|
| WO | 2018096524 A1 | 5/2018 |

*Primary Examiner* — Trinh T Nguyen
(74) *Attorney, Agent, or Firm* — Maschoff Brennan

(57) ABSTRACT

A pet toy includes surfaces for adhering abrasive material for dulling a pet's claws as the pet plays with the toy, as well as a cavity for receiving pet treats for encouraging play.

20 Claims, 2 Drawing Sheets

(56) References Cited

U.S. PATENT DOCUMENTS

| | | | |
|---|---|---|---|
| 2012/0085294 A1* | 4/2012 | Christianson | A01K 15/025 119/707 |
| 2012/0090552 A1* | 4/2012 | Haaf | A01K 15/024 119/706 |
| 2012/0090553 A1* | 4/2012 | Haaf | A01K 15/024 119/706 |
| 2012/0192803 A1* | 8/2012 | Haaf | A01K 15/025 119/621 |
| 2012/0279458 A1* | 11/2012 | Haaf | A01K 15/024 119/706 |
| 2015/0257366 A1 | 9/2015 | Gick | |
| 2016/0255812 A1 | 8/2016 | Wolfe, Jr. | |

* cited by examiner

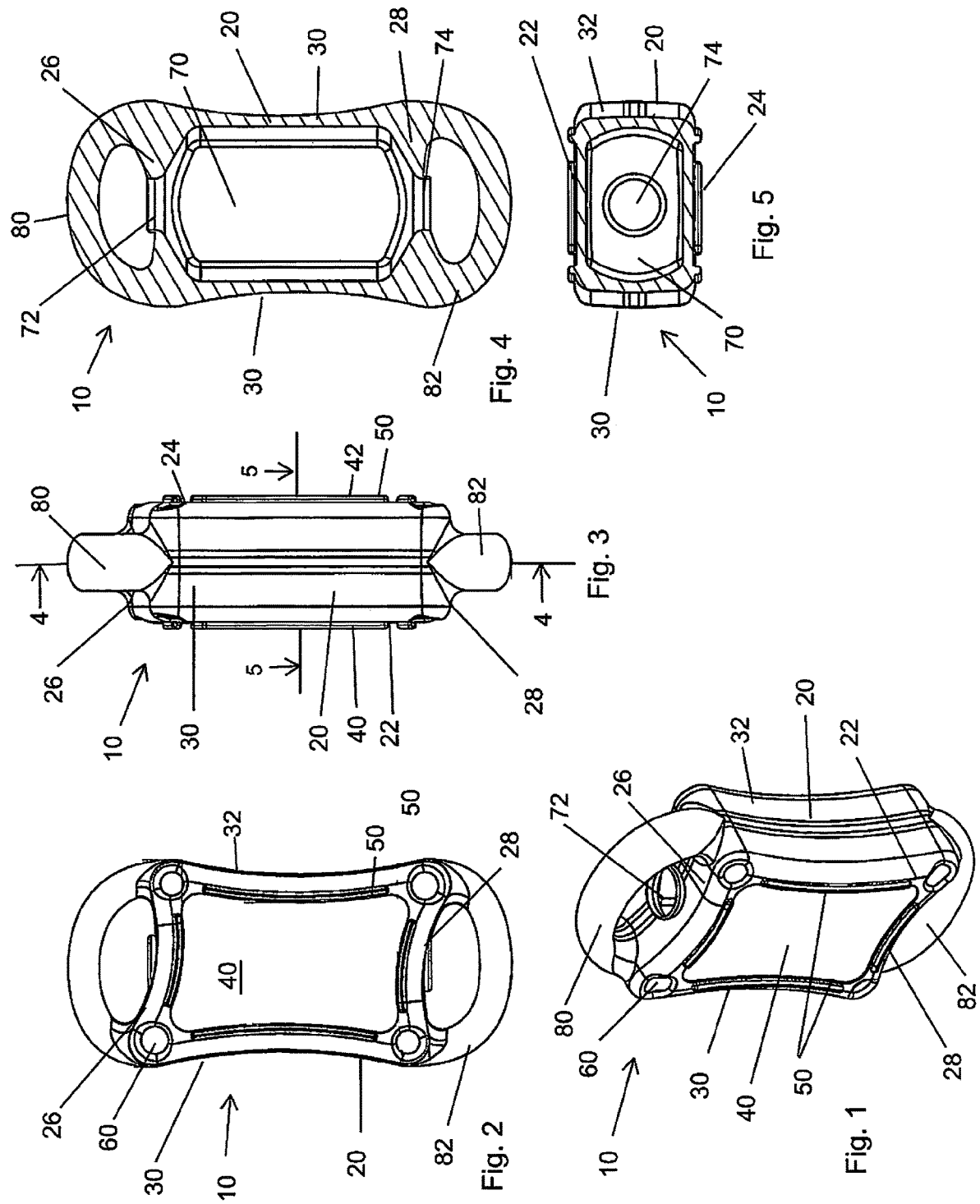

PET TOY

BACKGROUND OF THE INVENTION

1. Field of the Invention

The present invention relates to devices for caring for pet animals.

2. Brief Summary of the Prior Art

Pet toys of various types are well known in the art. Some such toys permit animal foodstuffs such as disclosed in U.S. Pat. Nos. 10,485,220 and 10,244,735 to be retained within the toy and to provide amusement for the animal in the interest of avoiding boredom and the destructive behavior which may sometimes accompany pet boredom. Other such toys are designed to aid with providing good care for pet animals. For example, U.S. Pat. No. 10,477,838 discloses a pet toy having cavities for engaging an animal's teeth with scrubbing elements with the goal of improving the animal's dental hygiene, while U.S. Pat. No. 10,206,373 discloses a double-ended pet toy adapted to clean a pet's teeth. U.S. Pat. Nos. 8,561,575 and 7,011,043 disclose apparatus for dulling an animal's claws using abrasive surfaces. U.S. Pat. No. 7,565,884 discloses a cat scratcher system for providing replaceable scatchable materials such as corrugated cardboard.

SUMMARY OF THE INVENTION

The present invention is a pet toy comprising a body having an upper face, a lower face, a top side, a bottom side, a left side, and a right side. At least one of the upper face and the lower face has a pad surface for adhering an abrasive material. Preferably, the body has an internal central cavity. Preferably, at least one aperture is formed in the body for accessing the internal central cavity. Preferably, at least one handle extends from the group consisting of the top side, the bottom side, the left side, and the right side of the body for grasping the pet toy. Preferably, the at least one aperture is formed in the group consisting of the top side, the bottom side, the left side, and the right side of the body. Preferably, the at least one handle and the at least one aperture are formed in the same side. Preferably, the at least one handle is arc-shaped. Preferably, the at least one handle is arc-shaped and extends from the side on either side of the aperture. In one presently preferred embodiment, the body has a pair of arc-shaped handles extending from opposite sides of the body, and at least one aperture is formed in one of the opposite sides. Preferably, the body has an aperture formed in each of the opposite sides. Preferably, the pet toy further includes at least one guard projecting from the at least one face having a pad surface, with the at least one guard projecting from the at least one face proximate the pad surface. Preferably, the upper surface of the pet toy has an upper pad surface and the lower face has a lower pad surface. Preferably, the pet toy further comprises at least one cavity for receiving a scent material. Preferably, the at least one cavity is formed in at least one of the upper surface and the lower surface. Preferably, the pet toy further comprises an abrasive material adhered to the pad surface.

BRIEF DESCRIPTION OF THE FIGURES

FIG. 1 is a perspective view of a first embodiment of a pet toy according to the present invention.

FIG. 2 is a front elevational view of the pet toy of FIG. 1.

FIG. 3 is a side elevational view of the pet toy of FIG. 1.

FIG. 4 is a front elevational sectional view of the pet toy of FIG. 1 taken along the line 4-4 of FIG. 3.

FIG. 5 is a plan sectional view of the pet toy of FIG. 1 taken along the line 5-5 of FIG. 3.

DETAILED DESCRIPTION

Figure 6:
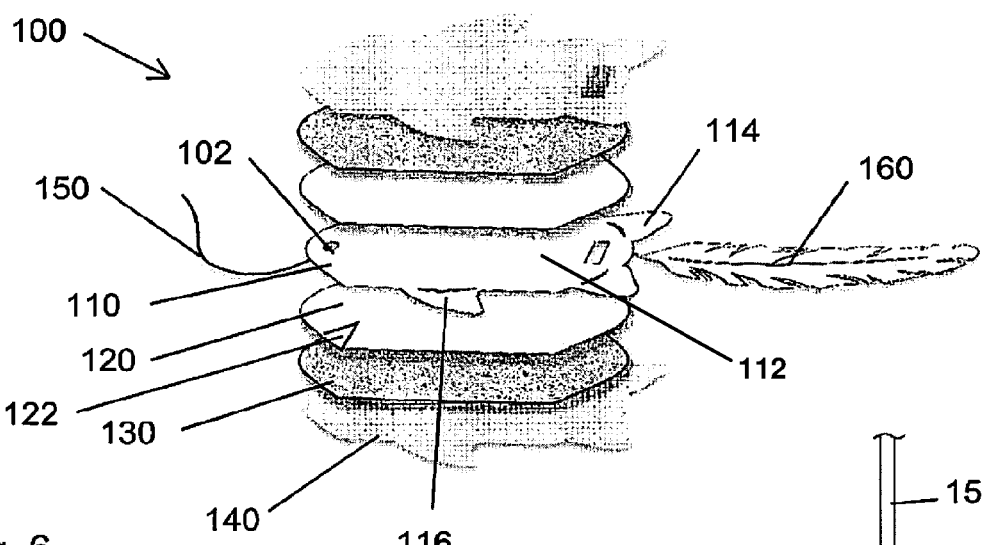
FIG. 6 is an exploded perspective view of a second embodiment of a pet toy according to the present invention.

The present invention provides a multi-purpose health and wellness toy with two key benefits: interactivity and healthy grooming. The pet toy of the present invention offers physical and mental entertainment with pet-centric specifications that are safe and healthy for pets. The pet toy of the present invention provides challenges for pets to use their natural instincts, and in particular, their sense of smell. Pets will have a sense of accomplishment, having engaged in an activity that is both fun and rewarding while they trim and file their own claws. The pet toy of the present invention mentally stimulates a pet's natural sense, and offers enrichment by helping satisfying instinctual needs. Further, the pet toy of the present invention supports interactive "play" with unpredictable bounces for games of fetch or tug-of-war, as well as advantageously reducing destructive chewing and fights boredom. Further, the pet toy of the present invention can be used for providing pet treats and snacks.

Referring now to the Figures in which like reference numerals represent like elements in each of the several views, there is shown in FIG. 1 a perspective view of a first embodiment of a pet toy 10 according to the present invention, as shown from above. The pet toy 10 has a generally rectangular body 20 having a generally flat upper face 22 and a generally flat lower face 24 (FIG. 3) parallel to the upper face 22. Preferably, the pet toy 10 is sized to be appropriate to the size of the pet for which the pet toy 10 is intended, such that, for example, a pet toy 10 intended for a larger breed dog is substantially larger overall than a pet toy 10 intended for a miniature breed dog. The body 20 further includes a top side 26, a bottom side 28, as well as a left side 30 and a right side 32. A generally flat upper pad surface 40 is formed on and slightly recessed below the upper face 22 of the pet toy 10, and a corresponding generally flat lower pad surface 42 is formed on and slightly recessed below the lower face 24. The pad surfaces 40, 42 are adapted to receive an abrasive material, such as a sheet of sandpaper, emery paper, or a sandstone material, for contacting and dulling a pet's claws or nails when the pet plays with the toy. The pad surfaces 40, 42 may be provided with an adhesive coating for adhering the abrasive material, or an adhesive material, such as Velcro, for the same purpose. Alternatively, the abrasive material itself may be adherent, as by being coated with an adhesive material. Each abrasive sheet is preferably provided with a fastener surface on the underside of the abrasive sheet order to releasably adhere the abrasive sheet to the pad surface 40, 42 so that the abrasive sheets can be replaced as necessary. Both the upper face 22 and the lower face 24 are provided with guard projections 50 which extend slightly above the respective upper pad surface 40 and lower pad surface 42 to prevent the abrasive material adhering to the pad surfaces 40, 42 from contacting and marring a flat surface on which the pet toy 10 may be placed, such as a wooden floor. The pet toy 10 also includes a plurality of generally circular cavities or scent receptacles 60 formed at the corners of the upper face 22 and the lower face 24, for receiving scent materials for encouraging pets to play with the pet toy 10.

As can be seen in the front elevational sectional view of FIG. 4, the body 20 includes a central cavity 70 which is accessible through a generally round first aperture 72 formed in the top side 26 of the body 20 and a corresponding generally round second aperture 74 formed in the bottom side of the body 20, with the first aperture 72 and second aperture 74 lying on a common axis. Animal food such as pet treats can be received within the central cavity 70. Preferably, such animal food is shaped so the food can be positioned such that the animal food extends at least partially through the first aperture 72 and/or the lower aperture 74, to provide at least partial access to an animal seeking the animal food. Alternatively, or in addition, other toy elements (such as feathers or the like) can be placed in an aperture 72, 74 to encourage play. Further, the apertures 72, 74 may be plugged or closed to raise level of difficulty.

The pet toy 10 also includes a first arc-shaped handle 80 extending from the top side 26 of the body 20 and extending over the first aperture 72 and a second arc-shaped handle 82 extending from the bottom side 28 of the body 20 and extending over the second aperture 74. Either handle 80, 82 can be grasped by a pet owner while his or her pet attempts to pull the pet toy 10 away by tugging at the other handle 82, 80. Preferably, the pet toy 10 is formed from a sturdy, durable material, such as an elastic material such as a natural rubber, a thermoplastic elastomer or the like, such that the pet toy 10 resists destruction by rough play with the pet. Preferably, the pet toy 10 is formed from an FDA-approved chewable rubber material that is both safe and environmentally friendly.

Figure 7:
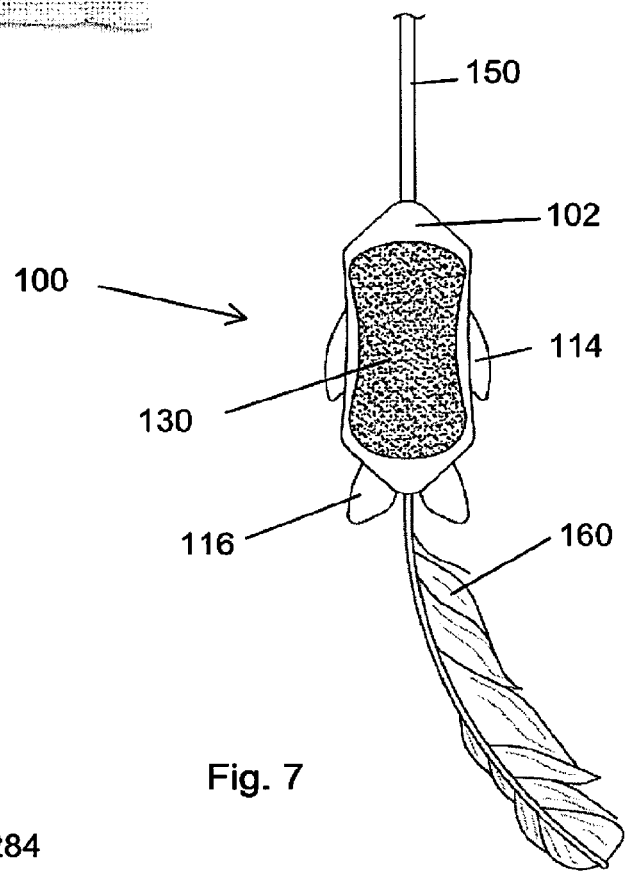
FIG. 7 is a top plan view of the pet toy of FIG. 6.

A second embodiment of a pet toy 100 according to the present invention is depicted in the exploded perspective view of FIG. 6. This embodiment of the pet toy 100 is specifically adapted for use with cats. The pet toy 100 includes a plurality of layers 120, 130, 140 arranged symmetrically on either side of a generally flat base layer 110. The base layer 110 is preferably formed from a flexible, durable material, and preferably takes the form of a stylized fish, and has an upper face and a lower face. The base layer 110 includes a central portion 112 from which preferably extends a plurality of simulated appendages 114, 116. When the pet toy 100 is to be used with cats, one or more of the appendages 114, 116 may take the form of a pocket in which catnip can be inserted to motivate play. On either side of the base layer 110 an interlayer or pad 120 preferably formed from a durable, flexible material, such as cotton fabric, is provided. Each interlayer 120 is adhered to a side of the base layer 110 by suitable means, such as by a fabric glue or the like. Preferably, the base layer is adhered to one or each of the interlayers 120 in such a way as to form pockets or central internal cavities 122 in which pet treats can be inserted through apertures formed between the base layer 110 and the interlayer 120. On the exterior side of each of the interlayers 120 an abrasive sheet 130 is provided, preferably, in the case of a pet toy 100 intended for cats, with a fine grain abrasive to aid in trimming the cat's claws as the cat plays with the pet toy 100. Each abrasive sheet 130 is preferably adhered to the respective interlayer 120 with a suitable adhesive material. Alternatively, a fastener surface, such as hook-like fasteners such as Velcro, can be provided on the interlayer 120, and the abrasive sheets 130 can be provided with a surface, such as a fabric, adherent to the fastener surface. In another aspect, the abrasive sheets 130 can be permanently adhered to the interlayers 120, and the abrasive sheets 120 themselves can be covered with a layer of netting material 140 in order of catching a cat's claws in the interest of motivating further play activity with the pet toy 100. Preferably, the aperture 102 is formed at one end of the pet toy 100 so that a cord or string 150 can be attached, thus forming a handle for the pet toy 100, so that the pet owner can engage his or her pet by dangling the pet toy 100. Preferably, a feather 160 or similar attractive object is attached to the pet toy 100 at one end of the pet toy 100, as best seen in the top plan view of FIG. 7. In a presently preferred embodiment, the pet toy 100 is formed from fabric materials, other than the abrasive sheets 120, and the various component are adhered together, such a with a non-toxic glue, and/or by sewing the layers together.

Figure 8:
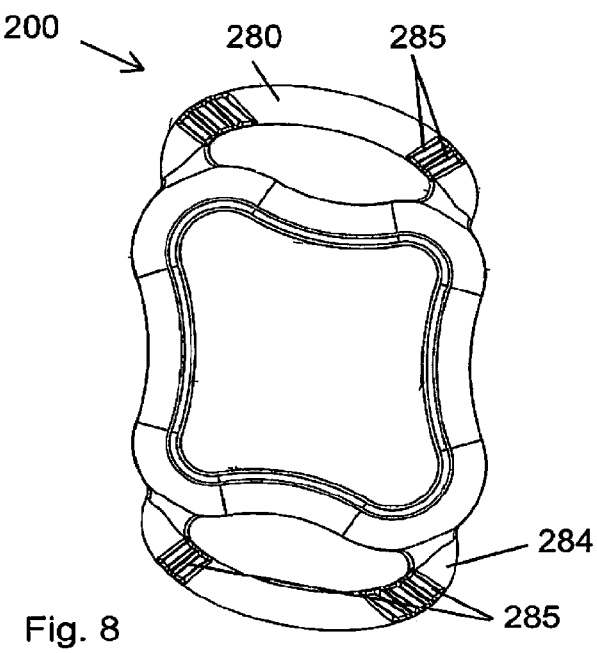
FIG. 8 is a top plan view of a third embodiment of a pet toy according to the present invention.

A third embodiment of a pet toy 200 according to the present invention is depicted in the top plan view of FIG. 8. While this embodiment is substantially similar to the first embodiment, the arc-shaped handles 280, 284, each includes plurality of grooves 285, preferably oriented generally perpendicular to the central axes of the handles 280, 284, and spaced apart and with a depth to permit canine teeth to contact the interior of the grooves 285 to encourage cleaning of the teeth by contacting foreign matter and the like on the teeth, such as, for example, canine molars. Alternatively, a plurality of grooves can be provided for the same purpose elsewhere on the pet toy, such as on the body of the pet toy (not shown).

Various modifications can be made in the details of the various embodiments of the apparatus of the present invention, all within the scope and spirit of the invention as defined by the appended claims.

The invention claimed is:

1. A pet toy comprising:
a body having an upper face, a lower face, a top side, a bottom side, a left side, and a right side;
at least one of the upper face and the lower face having:
a pad surface for adhering an abrasive material; and
one or more substantially circular scent cavities configured to receive a scent material;
the body having an internal central cavity; and
at least one aperture formed in the body for accessing the internal central cavity;
at least one handle, made of an elastic material, extending from the group consisting of the top side, the bottom side, the left side, and the right side of the body for grasping the pet toy, wherein the handle includes a plurality of grooves sized and positioned to be contacted by pet teeth and configured to clean the pet teeth.

2. A pet toy according to claim 1, wherein the at least one aperture is formed in the group consisting of the top side, the bottom side, the left side, and the right side of the body.

3. A pet toy according to claim 2, wherein the at least one handle and the at least one aperture are formed in the same side.

4. A pet toy according to claim 1, wherein the handle is arc-shaped.

5. A pet toy according to claim 3, wherein the at least one handle is arc-shaped and extends from the side on either side of the aperture.

6. A pet toy according to claim 1, the body having a pair of arc-shaped handles extending from opposite sides of the body, and at least one aperture formed in one of the opposite sides.

7. A pet toy according to claim 6, the body having an aperture formed in each of the opposite sides.

8. A pet toy according to claim 1, further including at least one guard projecting from the at least one face having a pad surface, the at least one guard projecting from the at least one face proximate the pad surface.

9. A pet toy according to claim 1, wherein the upper face has an upper pad surface and the lower face has a lower pad surface.

10. A pet toy according to claim 1, wherein the one or more substantially circular scent cavities are formed in at least one of the upper face and the lower face.

11. A pet toy according to claim 1, further comprising an abrasive material adhered to the pad surface.

12. A pet toy according to claim 1, wherein the handle is a string or cord.

13. A pet toy according to claim 1, further including catnip secured within the body.

14. A pet toy according to claim 11, further including netting material covering the abrasive material.

15. A pet toy according to claim 1, further including a feather adhered to the body.

16. The pet toy according to claim 1, wherein the elastic material includes a thermoplastic material or a natural rubber.

17. The pet toy according to claim 1, wherein the one or more substantially circular scent cavities are located in each corner of at least one of the upper face and the lower face.

18. A pet toy comprising:
- a body having an upper face, a lower face, a top side, a bottom side, a left side, and a right side;
- at least one of the upper face and the lower face including:
  - a pad surface for adhering an abrasive material; and
  - a guard projection extending in a perpendicular direction with respect to the pad surface and configured to prevent the abrasive material from contacting a flat surface upon which the pet toy is placed;
- the body having an internal central cavity; and
- at least one aperture formed in the body for accessing the internal central cavity;
  - at least one handle extending from the group consisting of the top side, the bottom side, the left side, and the right side of the body for grasping the pet toy.

19. A pet toy according to claim 17, further comprising at least one cavity for receiving a scent material.

20. A pet toy according to claim 17, further including a plurality of grooves sized and positioned to be contacted by pet teeth for cleaning the pet teeth.

* * * * *